US008473451B1

(12) United States Patent
Hakkani-Tur et al.

(10) Patent No.: US 8,473,451 B1
(45) Date of Patent: Jun. 25, 2013

(54) PRESERVING PRIVACY IN NATURAL LANGUAGE DATABASES

(75) Inventors: Dilek Z. Hakkani-Tur, Denville, NJ (US); Yucel Saygin, Istanbul (TK); Min Tang, Boulder, CO (US); Gokhan Tur, Denville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 360 days.

(21) Appl. No.: 11/086,954

(22) Filed: Mar. 22, 2005

Related U.S. Application Data

(60) Provisional application No. 60/592,855, filed on Jul. 30, 2004.

(51) Int. Cl.
*G06F 17/30* (2006.01)

(52) U.S. Cl.
USPC ............. 707/602; 379/201.11; 704/273

(58) Field of Classification Search
USPC .......... 707/104, 602, 609, 999.2; 379/201.11; 704/200, 273
See application file for complete search history.

(56) References Cited

U.S. PATENT DOCUMENTS

| 5,911,129 | A * | 6/1999 | Towell ............... 704/270.1 |
| 6,085,178 | A | 7/2000 | Bigus et al. |
| 6,404,872 | B1 * | 6/2002 | Goldberg et al. ........ 379/201.11 |
| 6,507,643 | B1 * | 1/2003 | Groner ................. 379/88.14 |
| 6,792,425 | B2 * | 9/2004 | Yagawa et al. ............ 707/10 |
| 7,028,184 | B2 * | 4/2006 | Hind et al. ............. 713/170 |
| 2002/0039408 | A1 * | 4/2002 | Hall et al. ............. 379/90.01 |
| 2003/0105634 | A1 * | 6/2003 | Abella et al. ............ 704/257 |
| 2003/0217272 | A1 * | 11/2003 | Agrawal et al. .......... 713/176 |
| 2004/0181514 | A1 * | 9/2004 | Santosuosso ............. 707/3 |
| 2004/0181670 | A1 | 9/2004 | Thune et al. |
| 2006/0005017 | A1 * | 1/2006 | Black et al. ............. 713/165 |

OTHER PUBLICATIONS

Francis Kubala, Named Entity Extraction from Speech, 1998 en.scientificcommunications.org.*
Curry Guinn, Extracting Emotional Information from the Text of Spoken Dialog, 2003 Proceedings of the 9th international conference.*
Allen L. Gorin, Automated Natural Spoken Dialog, Apr. 2002 IEEE, p. 51-56.*
Richard Conway et al. "Selective Partial Access to a Database", Cornell University, Ithaca, New York.
Patrick Ruch et al. "Medical Document Anonymization with a Semantic Lexicon", Medical Informatics Division, University Hospital of Geneva; ISSCO, University of Geneva.
Rakesh Agrawal et al. "Privacy-Preserving Data Mining". IBM Almaden Research Center, San Jose, California.

* cited by examiner

*Primary Examiner* — Thu-Nguyet Le

(57) ABSTRACT

An apparatus and a method for preserving privacy in natural language databases are provided. Natural language input may be received. At least one of sanitizing or anonymizing the natural language input may be performed to form a clean output. The clean output may be stored.

20 Claims, 2 Drawing Sheets

```
PHONE_NUMBER::=ϵ:<PHONE_NUMBER
              ϵ:<AREA_CODE>AREA_CODEϵ:</AREA_CODE>
              ϵ:<LOCAL>LOCALϵ:</LOCAL>
              ϵ:</PHONE_NUMBER>
AREA_CODE    ::=DIGIT DIGIT DIGIT
LOCAL        ::=DIGIT DIGIT DIGIT DIGIT DIGIT DIGIT DIGIT
DIGIT        ::=0:0|1:1|...|9:9|
```

PRESERVING PRIVACY IN NATURAL LANGUAGE DATABASES

RELATED APPLICATIONS

This application claims the benefit of Provisional Application 60/592,855, entitled "PRESERVING PRIVACY IN SPOKEN LANGUAGE DATABASES" and filed on Jul. 30, 2004, the contents of which are herein incorporated by reference in its entirety.

BACKGROUND OF THE INVENTION

1. Field of the Invention

The present invention relates to preserving private or confidential information in natural language databases, and more specifically to extraction of private information from natural language databases and to hiding an identity of a person associated with the private information.

2. Introduction

Goal-oriented spoken dialog systems aim to identify intents of humans, expressed in natural language, and take actions accordingly to satisfy their requests. In a spoken dialog system, typically, first the speaker's utterance is recognized using an automatic speech recognizer (ASR). Then, the intent of the speaker is identified from the recognized sequence, using a spoken language understanding (SLU) component. The following is an example dialog between an automated call center agent and a user.

System: How may I help you?
User: Hello. This is John Smith. My phone number is 973 area code 1239684. I wish to have my bill, long distance bill, sent to my Discover card for payment.
System: OK, I can help you with that. What is your credit card number?
User: My Discover card number is 28743617891257 hundred and it expires on first month of next year.
System: . . .

As it is clear from this example, these calls may include very sensitive information about the callers, such as names as well as the credit card and phone numbers.

State-of-the-art data-driven ASR and SLU systems are trained using large amounts of task data which is usually transcribed and then labeled by humans. This tends to be a very expensive and laborious process. In the customer care domain, "labeling" means assigning one or more of the pre-defined intent(s) (call-type(s)) to each utterance. As an example, consider the utterance I would like to pay my bill, in a customer care application. Assuming that the utterance is recognized correctly, the corresponding intent or the call-type would be Pay(Bill) and the action would be learning the caller's account number and credit card number and fulfilling the request. The transcribed and labeled data may then used to train automatic speech recognition and call classification models.

The bottleneck in building an accurate statistical system is the time spent preparing high quality labeled data. Sharing of this data is extremely important for machine learning, data mining, information extraction and retrieval, and natural language processing research. Reuse of the data from one application, while building another application is also crucial in reducing the development time and making the process scalable. However, preserving privacy while sharing data is important since such data may contain confidential information. Outsourcing the data and tasks that require private data is another example of information sharing that may jeopardize the privacy of speakers. It is possible to mine natural language databases to gather aggregate information using statistical methods. The gathered information may be confidential or sensitive. For example, in an application from the medical domain, using the caller utterances and their call-types, one can extract statistical information such as the following:

y % of the U.S. doctors prescribe <DRUG1> instead of <DRUG2> x % of company A's customers call the customer care center to cancel their service which may be information that should be kept private due to business-related reasons. A way of making information available while protecting privacy and confidentiality is needed.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

In a first aspect of the invention, a method for preserving privacy in natural language databases is provided. Natural language input may be received. At least one of sanitizing or anonymizing the natural language input may be performed to form a clean output. The clean output may be stored.

In a second aspect of the invention, an apparatus for preserving privacy in natural language databases is provided. The apparatus may include a processor and storage configured to store a plurality of instructions for the processor. The processor may be configured to receive natural language input, perform at least one of sanitizing or anonymizing the natural language input to form a clean output, and store the clean output.

In a third aspect of the invention, an apparatus for preserving privacy in natural language databases is provided. The apparatus may include means for receiving natural language input, means for performing at least one of sanitizing, or anonymizing the natural language input to form a clean output, and means for storing the clean output.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Exemplary Spoken Dialog System

Figure 1:
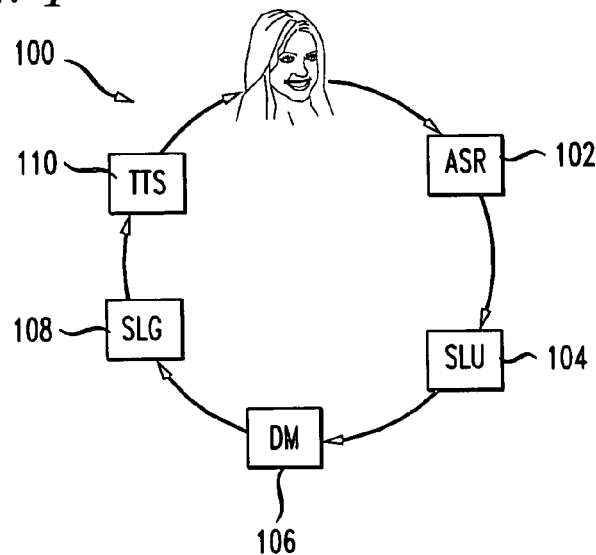
FIG. 1 illustrates an exemplary spoken dialog system.

FIG. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108, and a text-to-speech (TTS) module 110.

ASR module 102 may analyze speech input and may provide a transcription of the speech input as output. SLU module 104 may receive the transcribed input and may use a natural language understanding model to analyze the group of words that are included in the transcribed input to derive a meaning from the input. DM module 106 may receive the meaning of the speech input as input and may determine an action, such as, for example, providing a spoken response, based on the input. SLG module 108 may generate a transcription of one or more words in response to the action provided by DM 106. TTS module 110 may receive the transcription as input and may provide generated audible as output based on the transcribed speech.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text, generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. Further, the modules of system 100 may operate independent of a full dialog system. For example, a computing device such as a smartphone (or any processing device having an audio processing capability, for example a PDA with audio and a WiFi network interface) may have an ASR module wherein a user may say "call mom" and the smartphone may act on the instruction without a "spoken dialog interaction".

Figure 2:
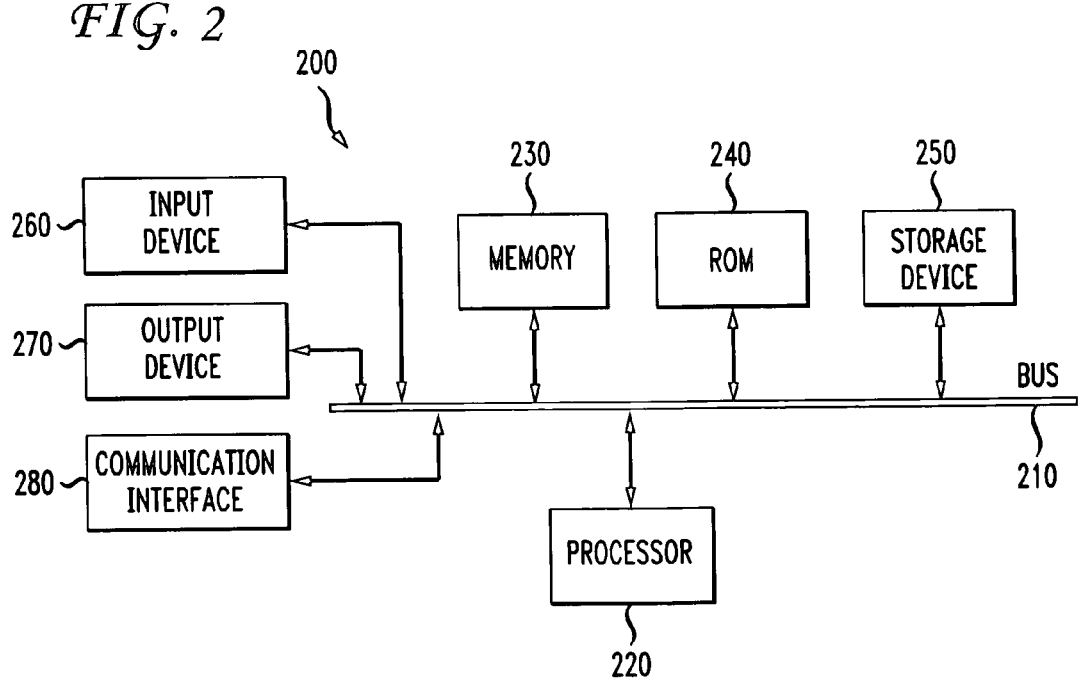
FIG. 2 illustrates an exemplary system which may be used in implementations consistent with the principles of the invention.

FIG. 2 illustrates an exemplary processing system 200 in which one or more of the modules of system 100 may be implemented. Thus, system 100 may include at least one processing system, such as, for example, exemplary processing system 200. System 200 may include a bus 210, a processor 220, a memory 230, a read only memory (ROM) 240, a storage device 250, an input device 260, an output device 270, and a communication interface 280. Bus 210 may permit communication among the components of system 200. Processor 220 may include at least one conventional processor or microprocessor that interprets and executes instructions. Memory 230 may be a random access memory (RAM) or another type of dynamic storage device that stores information and instructions for execution by processor 220. Memory 230 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive.

Input device 260 may include one or more conventional mechanisms that permit a user to input information to system 200, such as a keyboard, a mouse, a pen, a microphone, a voice recognition device, etc. Output device 270 may include one or more conventional mechanisms that output information to the user, including a display, a printer, one or more speakers, or a medium, such as a memory, or a magnetic or optical disk and a corresponding disk drive. Communication interface 280 may include any transceiver-like mechanism that enables system 200 to communicate via a network. For example, communication interface 280 may include a modem, or an Ethernet interface for communicating via a local area network (LAN). Alternatively, communication interface 280 may include other mechanisms for communicating with other devices and/or systems via wired, wireless or optical connections. In some implementations of natural spoken dialog system 100, communication interface 280 may not be included in processing system 200 when natural spoken dialog system 100 is implemented completely within a single processing system 200.

System 200 may perform functions in response to processor 220 executing sequences of instructions contained in a computer-readable medium, such as, for example, memory 230, a magnetic disk, or an optical disk. Computer-readable mediums and computer-readable storage mediums can be tangible, non-transitory, or transitory. Such instructions may be read into memory 230 from another computer-readable medium, such as storage device 250, or from a separate device via communication interface 280.

Exemplary Process

Figures 3, 4:
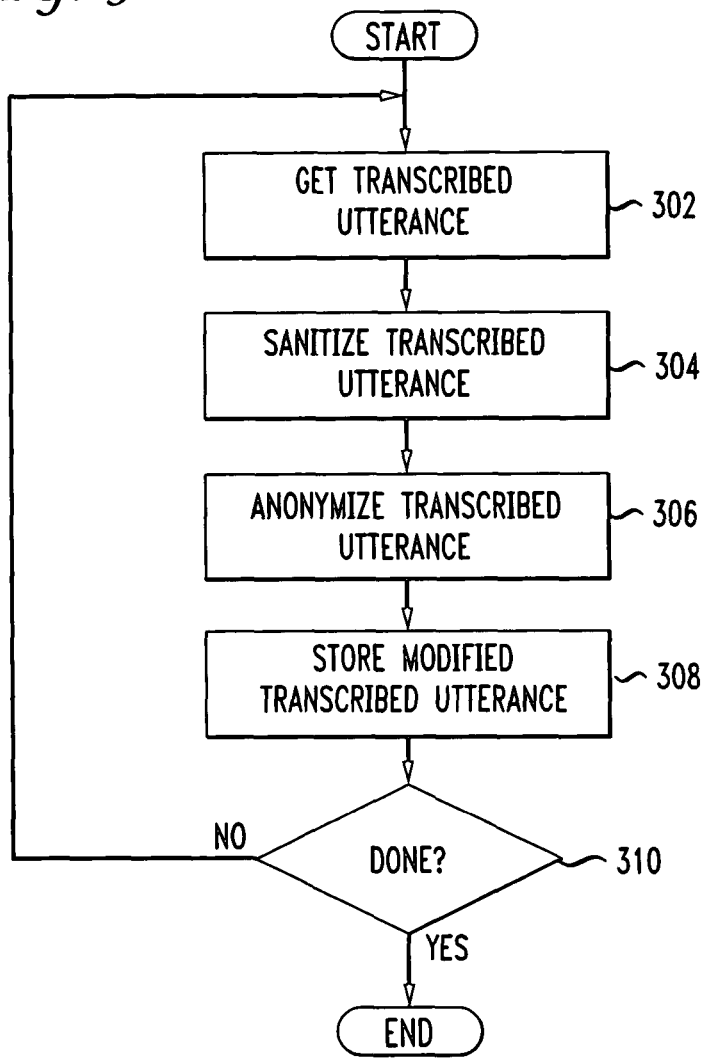
FIG. 3 is a flowchart of a process that may be performed in implementations consistent with the principles of the invention.
FIG. 4 illustrates a simple Backus Naur Form (BNF) that defines a grammar for a phone number.

FIG. 3 is a flowchart that illustrates an exemplary process that may be performed by implementations consistent with the principles of the invention. In one implementation, the process may be performed on a system, such as system 200, and may be performed on data, such as transcribed data such as, for example, transcribed utterance data, prior to releasing the data to third parties.

The process may begin with retrieval of a transcribed utterance (act 302). The transcribed utterance may then be sanitized (act 304). The details of sanitation are described below. The transcribed utterance may then be anonymized such that a source of the utterance (i.e., a speaker) may not be easily determined (act 306). The details of anonymization are described in detail below. The modified or cleaned transcribed utterances may then be stored (act 308). A check may be performed to determine whether any additional transcribed utterances remain to be processed (act 310). Once all utterances are processed, the utterances may be upsampled or downsampled according to their call-types to change their call-type distribution (act 312). If so, then acts 302-310 may be repeated. Otherwise, the process is completed.

Sanitization

The aim of sanitization is to hide personal information, given privacy requirements, in order to disable data mining approaches from extracting personal or other private business related information in spoken language databases. This can be considered privacy preserving text mining.

Sanitization depends on the corresponding task. Data quality should be preserved after the sanitization. Data quality may be measured in terms of readability and the ability to use the sanitized text for the corresponding task. For example, if the data is going to be used for text classification, sanitization should be performed without adversely affecting classification accuracy. For example, if information retrieval is to be performed, sanitization methods should not interfere with indexing and document matching methods.

Three methods are known for partial access to databases. These methods may be used in implementations consistent with the principles of the invention for sanitization of personal information in spoken language utterances. The methods include value distortion, value disassociation and value class membership. Value distortion alters confidential values that need to be hidden with random values. Value dissociation keeps a true distribution of the values, but replaces each value in a record with a value of the same field from another record. This can be achieved, for example, by exchanging the values across sentences. Value-class membership exchanges individual values with disjoint, mutually exhaustive classes. For example, all names of people may be changed to a single token <NAME>.

Modifying the values of named entities or replacing the values with generic tokens is the simplest form of text sanitization. If the named entities are not already marked during transcription or labeling, automatic named entity extraction methods, which are well studied in the computational linguistics community, may be utilized. K-anonymity can be assured for text sanitization while determining the generic tokens. K-anonymity is defined, such that as it applies to names of people, the names and other features that may be used to identify a person may be generalized such that they map to at least k-people. For k-anonymity as it applies to numeric values such as salary, a concept hierarchy may be exploited. For example, the salary may be mapped to a more generic value (e.g., low, average, high, and astronomic linguistic hedges in the concept hierarchy).

The generic tokens may also preserve non-sensitive information to ensure readability of the text. For example, the gender or identification of the people can be marked in the token for the resolution of further (pronominal) references (i.e., <PERSON> versus <PERSON, GENDER=MALE>). An even harder task may be associating references during sanitization, for example <DATE2> may be extended as <DATE2=DATE1+3 days>.

In implementations consistent with the principles of the invention, the named entities may be found in a given transcribed utterance database of calls, and the named entities may be hidden by using any of the three previously-discussed sanitization methods. For, example, when using distortion, the named entity values may be replaced with random values from the same named entity category. When using dissociation, the value of the named entity maybe exchanged with the value of another named entity of the same category in the transcribed utterance database. When using value-class membership, the named entity values may be replaced with generic named entity category tokens, such as: <NAME> and <PHONE_NUMBER>. This last approach may be likely to improve accuracy of call-type classification due to better generalization of word n-gram features, because call-types are expected to have strong associations with named entity categories, but not necessarily with their values.

The purpose of named entity extraction is to identify the sub-string of the input utterance that contains a named entity, and extract its type. For example in the utterance "my phone number is 1 2 3 4 5 6 7 8 9 0", the sub-string "1 2 3 4 5 6 7 8 9" contains the named entity of type <PHONE_NUMBER>. After named entity extraction, this entity can be marked in the utterance using eXtensible Markup Language (XML) tags: "my phone number is <PHONE_NUMBER>1 2 3 4 5 6 7 8 9 0</PHONE_NUMBER>" for sanitization purposes.

Implementations consistent with the principles of the invention may employ a rule-based or a statistical approach for named entity extraction. For example, for each entity, a grammar in Backus Naur Form (BNF) may be manually created. The creation could involve the reuse and extension of a library of application-independent named entity grammars ("phone numbers'", "dates", etc.) or a set of named entity grammars may be created for the current application.

FIG. 4 shows a simple example of a grammar that may be used to extract phone numbers. These grammars are typically regular expressions written in a grammar rule notation. The grammars may be compiled into finite-state transducers whose arcs are labeled with the terminals of the grammars. The two components of the arc labels may then be interpreted as the input and the output symbols leading to a finite-state transducer representation. As one can see from FIG. 4, PHONE_NUMBER is made up of an area code, a local number and a phone number. Area code includes 3 digits, local number includes 7 digits, and each digit is made up of any of the numbers 0 through 9.

For named entity extraction, each utterance FSM ($U_i$) may be composed with each entity grammar $F_j$ sequentially resulting in an FSM ($M_i$) representing the utterances with the named entities marked. The grammar rules can also specify the context in which they can apply, to prevent false acceptances.

Detecting names of people may be difficult using regular grammars. A heuristic or automated approach may be employed in implementations consistent with the principles of the invention to detect names. In one implementation consistent with the principles of the invention, grammars may be used to detect location and organization names. All other words that start with an upper-case letter may be assumed to be names. Because names may already be marked with an uppercase initial letter, the heuristic approach is reasonable and a significant performance improvement was observed during experiments.

The above sanitization approaches may be used to sanitize output of an ASR component as well as human transcriptions. The initial letters of proper names can also be in upper-case in the ASR output, if the proper names are also capitalized in the training data. However, due to the noise introduced by ASR errors, instead of using regular grammars for Named Entity (NE) extraction, the use of statistical approaches may be more appropriate.

Indirect Threats

Text sanitization may also help protect data against some indirect threats. To protect against indirect threats, the utterances may be changed and therefore, the utterance and call-type distribution, by up-sampling or down-sampling the data. By changing the utterance and call-type distribution, data mining methods attacking privacy would not work. Spoken language understanding models may be trained using spoken dialog utterances labeled with user intents (call-types). Changing the utterance and therefore, the call-type distribution will prevent others from extracting such indirect information. The utterances may be down-sampled by collapsing the same or very similar utterances into one example. This is known as cloning. For example, once the filled pauses and some other dysfluencies are filtered, and some named entities and frequent sequences are collapsed into their category tags, the utterances may be down-sampled by just collapsing. For up-sampling, some utterances may be selected and duplicated by adding variations and by inserting dysfluencies, using a synonym list to change words, paraphrasing, or changing the named entity values. In an alternative implementation, the utterances may be compiled into a finite state machine (FSM), and may generate as many paths and utterances as needed. FSMs may be used to generate the alternatives of similar frequent sequences such as "I would like to" and "I wanna", and named entities.

Anonymization

It is possible to identify a speaker of utterances or an author of a text with very high accuracy. Features that can be used are words and phrases (n-grams) in the utterances or the text or, the total number of tokens, total number of types, total number of characters, and the number of types that occur once. Through experiments with a limited set of articles from a newspaper, it was determined that each author uses a characteristic frequency distribution over words and phrases. Text anonymization is therefore necessary to protect the privacy of the authors, as well as speakers. Text anonymization aims at preventing the identification of the author or speaker (who is also considered to be the owner) of a given text or utterances. The concept of k-anonymity can be used as privacy metric for anonymization in the data mining context. K-anonymity against text classification is satisfied if text classification tools cannot differentiate between k authors for a text.

For an anonymization process with respect to documents, where documents may include electronically stored text or transcribed utterances, a fixed set of documents or utterances may be assumed, for example, a digital library which collects all the major work of a given set of authors. Authorship information for some documents may be known and some of the authorships may not be known. A typical example is a set of articles and a set of reviews for those articles. However, one should consider the case when the adversary is able to find another set of documents for the authors, for example, by searching the internet, where the number of documents that could be found is practically infinite.

Text classification techniques may be used to first parse the text to obtain the features. Features that may be used to classify text may include the frequencies of words, phrases, and punctuation marks. Each document may be represented as a feature vector where each feature may be represented by a real number.

Assuming that the set of document is fixed, let DP be the set of documents where the authorship information is public, and DA be the set of documents where the authorship information is confidential. An adversary could train a classification model using DP to predict the authorship information of a document in DA. Since DP is known and fixed, anonymization can work on both DP and DA. The documents in DP and DA may be modified in order to change their feature vectors so that the data mining tools may not classify the document accurately.

The most general model that an adversary may use is a classification model that returns probabilities for each author for a given document. This way each author will have a certain probability of being an author for a specific anonymous document. One approach that may be used to achieve k-anonymity is to change the probability of the real author so that (s)he falls into one of the top 1 . . . k positions randomly selected among the top-k authors with the highest probabilities. Probabilities may then be changed by updating the documents in DP and DA. This process may be performed in such a way that the original meaning of the document is preserved. When DP is not fixed then the model that could be constructed by the adversary cannot be known in advance which complicates the anonymization process. In this case the approach may be to update the anonymous documents in such a way that their feature vectors look alike to obscure the adversary. This can be achieved by changing the feature vectors such that at least k of the documents with different authors have the same feature vector. This may be accomplished by taking the mean of k feature vectors of documents with different authors and assigning the mean as the new feature vector.

The anonymization method may depend heavily on features of a classifier used for authorship identification by the adversary. If the classifier only uses unigram word distributions, then anonymization may be achieved simply by replacing the words with their synonyms or by mapping them to more generic terms, as was done for sanitization. If the classifier uses a different feature set, such as the distribution of stop-words (such as "the" or "by") or words from a closed class part of speech (word category) tags (that is, almost all words which are not nouns, verbs, or adjectives) then revising the sentences may be a solution. If the classifier uses other features such as passive or active voice, specific clauses, average length of sentences, etc., these features may need to be specifically addressed. If the text anonymization task has no information about the features of the classifier that the adversary is using, then the optimal solution may be to assume that the classifier uses all possible features of which one may think and anonymize the text accordingly.

CONCLUSIONS

Although, some examples above pertained to speech and others pertained to documents, which may be electronically stored, the techniques discussed for sanitization and anonymization may apply to either electronic documents or transcribed speech, both of which may use natural language.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, the order of acts in the exemplary process illustrated by the flowchart of FIG. 3 may be changed. Further, the sanitization and anonymization techniques may be applied to either documents or speech. Accordingly, the appended claims and their legal equivalents should only define the invention, rather than any specific examples given.

We claim as our invention:

1. A method comprising:
   selecting a transcription of a spoken natural language input from a speaker, the transcription comprising sensitive information and non-sensitive information;
   sanitizing the sensitive information, to form a clean transcription of the spoken natural language input, the clean transcription having sanitized text and non-sanitized text;
   anonymizing the non-sanitized text in the clean transcription by modifying a first feature vector associated with the non-sanitized text, to yield a modified first feature vector, such that the modified first feature vector is the same as a second feature vector of a different document from the transcription, to yield a clean anonymous text; and
   storing the clean anonymous text.

2. The method of claim 1, wherein sanitizing the sensitive information further comprises:
   finding a named entity in the spoken natural language input; and
   performing, on the named entity, one of value distortion, value disassociation, and value class membership to preserve privacy in a spoken natural language database.

3. The method of claim 2, wherein sanitizing the sensitive information further comprises:
   performing, on the named entity, two of value distortion, value disassociation, and value class membership to preserve privacy in the spoken natural language database.

4. The method of claim 2, further comprising performing value class membership by replacing a value with a generic token.

5. The method of claim 4, wherein performing value class membership further comprises:
   placing an indication of one of a gender and other information in the generic token when the value represents an identification of a person.

6. The method of claim 2, wherein finding the named entity further comprises using an automated approach to detect a name.

7. The method of claim 1, wherein anonymizing further comprises replacing a word in the non-sanitized text with a corresponding synonym.

8. The method of claim 1, wherein anonymizing further comprises altering a plurality of stored documents, each stored document of the plurality of stored documents comprising the clean transcription, to change corresponding feature vectors of each of the plurality of stored documents to match.

9. The method of claim 1, wherein sanitizing the sensitive information further comprises changing a distribution of utterances and semantically labeled data in the non-sanitized text.

10. A system comprising:
    a processor; and
    a storage medium having instructions stored which, when executed by the processor, cause the processor to perform operations comprising:
      selecting a transcription of a spoken natural language input from a speaker, the transcription comprising sensitive information and non-sensitive information;
      sanitizing the sensitive information, to form a clean transcription of the spoken natural language input, the clean transcription having sanitized text and non-sanitized text;
      anonymizing the non-sanitized text in the clean transcription by modifying a first feature vector associated with the non-sanitized text, to yield a modified first feature vector, such that the modified first feature vector is the same as a second feature vector of a different document from the transcription yield a clean anonymous text; and
      storing the clean anonymous text.

11. The system of claim 10, wherein sanitizing the sensitive information further comprises:
    finding a named entity in the spoken natural language input; and
    performing, the named entity, one of value distortion, value disassociation, and value class membership to preserve privacy in a spoken natural language database.

12. The system of claim 11, wherein sanitizing the sensitive information further comprises performing, on the named entity, at least two of value distortion, value disassociation, and value class membership to preserve privacy in the spoken natural language database.

13. The system of claim 11, the storage medium having additional instructions stored which result in the operations further comprising performing value class membership by replacing a value with a generic token.

14. The system of claim 11, the storage medium having additional instructions stored which result in the operations further comprising marking the named entity using a tag.

15. The system of claim 13, the storage medium having additional instructions stored which result in the operations further comprising performing value class membership by placing an indication of one of a gender and other information in the generic token when the replaced value represents an identification of a person.

16. The system of claim 11, wherein finding the named entity further comprises using an automated approach to detect names.

17. The system of claim 10, the storage medium having additional instructions stored which result in the operations further comprising performing anonymizing by using an automated approach to detect names.

18. The system of claim 10, the storage medium having additional instructions stored which result in the operations further comprising altering a plurality of stored documents which comprise the clean transcription to change corresponding feature vectors of each of the plurality of stored documents to match.

19. The system of claim 10, the storage medium having additional instructions stored which result in the operations further comprising performing sanitizing by changing a distribution of utterances and semantically labeled data in the non-sanitized text.

20. A non-transitory computer-readable storage medium having instructions stored which, when executed by a computing device, cause the computing device to perform operations comprising:

selecting a transcription of a spoken natural language input from a speaker, the transcription comprising sensitive information and non-sensitive information;

sanitizing the sensitive information, to form a clean transcription of the spoken natural language input, the clean transcription having sanitized text and non-sanitized text;

anonymizing the non-sanitized text in the clean transcription by modifying a first feature vector associated with the non-sanitized text, to yield a modified first feature vector, such that the modified first feature vector is the same as a second feature vector of a different document from the transcription to yield a clean anonymous text; and storing the clean anonymous text.

\* \* \* \* \*

UNITED STATES PATENT AND TRADEMARK OFFICE
CERTIFICATE OF CORRECTION

PATENT NO.        : 8,473,451 B1
APPLICATION NO.   : 11/086954
DATED             : June 25, 2013
INVENTOR(S)       : Dilek Z. Hakkani-Tur et al.

Page 1 of 1

It is certified that error appears in the above-identified patent and that said Letters Patent is hereby corrected as shown below:

On the title page, Item (73), the Assignee should read as follows:

--AT&T Intellectual Property II, L.P.--

Signed and Sealed this
Twenty-sixth Day of November, 2013

Margaret A. Focarino
*Commissioner for Patents of the United States Patent and Trademark Office*